5412X
J. & C. Serrall,
2 Sheets. Sheet 1.
Pattern for Casting.
Patented Mar. 25, 1829.
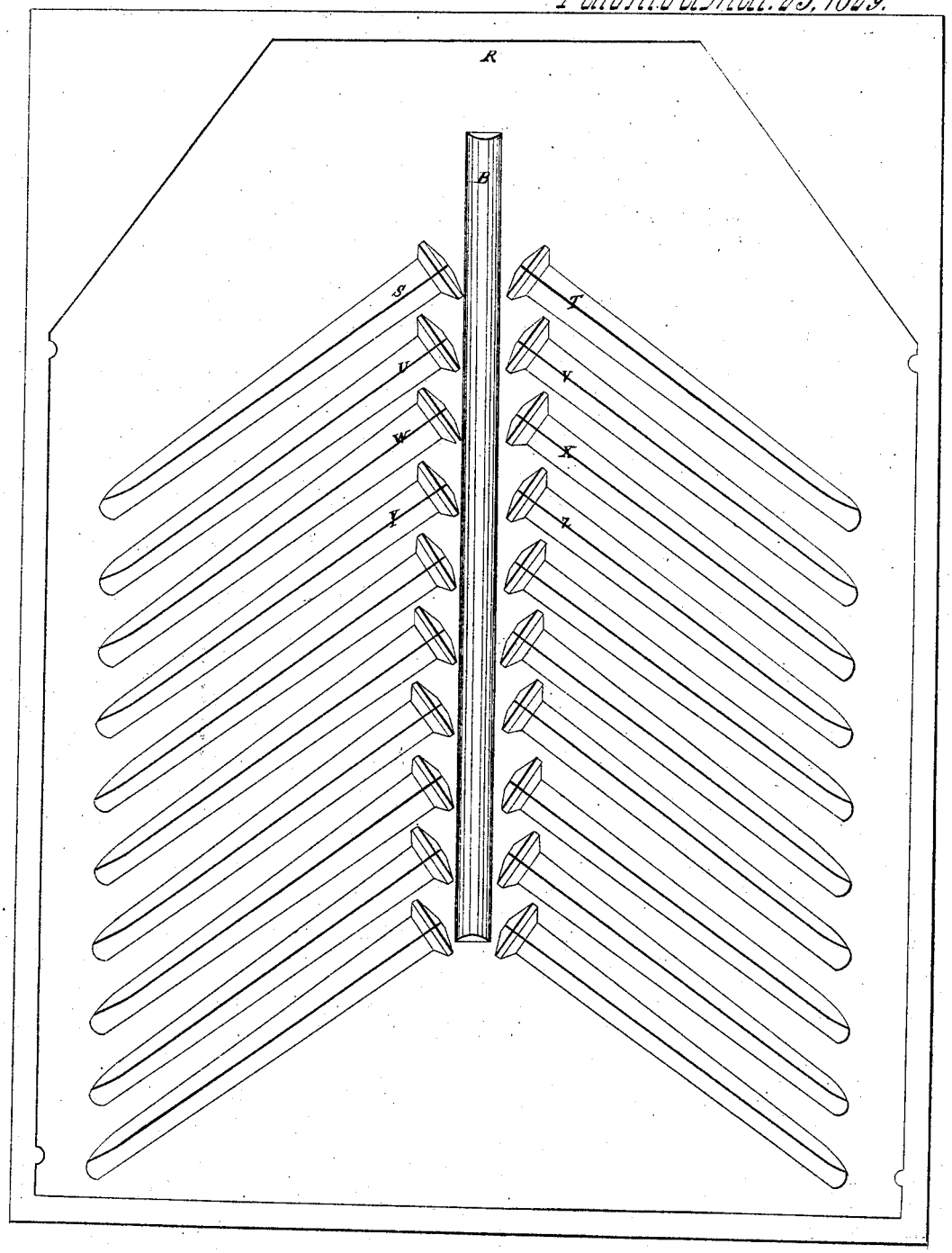

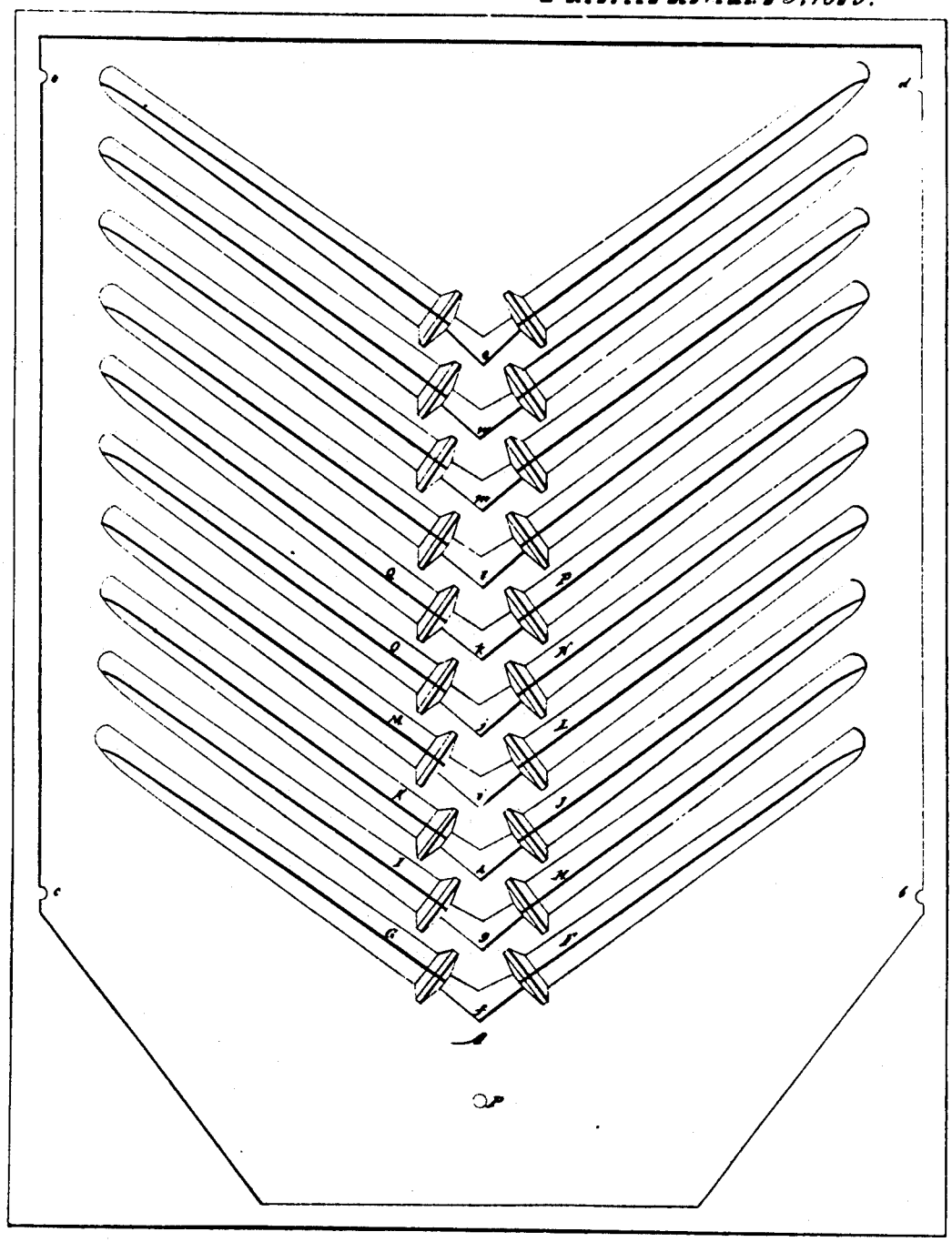

5412X
J. & C. Serrall,
Sheets, Sheet 2.
Pattern for Casting.
Patented Mar. 25, 1829.